US010260155B2

(12) United States Patent
Swaminathan et al.

(10) Patent No.: US 10,260,155 B2
(45) Date of Patent: Apr. 16, 2019

(54) CALCIUM SILICATE HYDRATE ANION EXCHANGE MEMBRANE USEFUL FOR WATER ELECTROLYSIS AND FUEL CELLS AND A PROCESS FOR THE PREPARATION THEREOF

(71) Applicant: Council of Scientific and Industrial Research, New Dehli (IN)

(72) Inventors: Jayashree Swaminathan, Tamil Nadu (IN); Subbiah Ravichandran, Tamil Nadu (IN); Donald Jonas Davidson, Tamil Nadu (IN); Ganapathy Sozhan, Tamil Nadu (IN); Subramanyan Vasudevan, Tamil Nadu (IN); Singaram Vengatesan, Tamil Nadu (IN); Srinivasan Muralidharan, Tamil Nadu (IN)

(73) Assignee: Council of Scientific & Industrial Research, New Delhi (IN)

( * ) Notice: Subject to any disclaimer, the term of this patent is extended or adjusted under 35 U.S.C. 154(b) by 0 days.

(21) Appl. No.: 15/418,966

(22) Filed: Jan. 30, 2017

(65) Prior Publication Data
US 2017/0218525 A1 Aug. 3, 2017

(30) Foreign Application Priority Data
Jan. 28, 2016 (IN) .............................. 201611003056

(51) Int. Cl.
*H01M 8/083* (2016.01)
*C25B 1/10* (2006.01)
(Continued)

(52) U.S. Cl.
CPC ................. *C25B 1/10* (2013.01); *B01J 41/02* (2013.01); *B01J 41/10* (2013.01); *C04B 28/18* (2013.01);
(Continued)

(58) Field of Classification Search
None
See application file for complete search history.

(56) References Cited

U.S. PATENT DOCUMENTS 7,888,397 B1 2/2011 Hibbs et al.
8,436,057 B1 5/2013 Verkade et al.
(Continued)

OTHER PUBLICATIONS

Kim et al., "Effect of W/C Ratio on Durability and Porosity in Cement Mortar with Constant Cement Amount", Hindawi Publishing Corporation, Advances in Material Science and Engineering, vol. 2014, 11 pages.

(Continued)

*Primary Examiner* — Karie O'Neill Apicella
(74) *Attorney, Agent, or Firm* — Baker & Hostetler, LLP; Tayan B. Patel, Esq.

(57) ABSTRACT

The present invention relates to a process for the preparation of Calcium Silicate Hydrate anion exchange membrane (cement paste) with an ionic conductivity of the order of $10^{-3}$ S/cm. The membrane can be formulated by mixing Ordinary Portland Cement (OPC) and water with the cement to water ratio of 1:0.45. After initial setting time, the membrane undergoes curing in 7% calcium chloride solution and the $Cl^-$ ions in the membrane is converted to $OH^-$ form by immersing into saturated $Ca(OH)_2$ solution with pH 14 and it has been washed to remove the excess alkali. This membrane has high mechanical strength (Ultimate Tensile Strength: 6.3 MPa) and does not deteriorate even at high temperature (up to 450° C.) and alkaline atmosphere (pH 11.5-14). Also disclosed is a method of producing in-situ formation of membrane electrode assembly. This invention encompasses a process for producing and using the membrane in water electrolysis and fuel cell.

3 Claims, 10 Drawing Sheets

(51) Int. Cl.
*C25B 13/04* (2006.01)
*B01J 41/10* (2006.01)
*C04B 41/00* (2006.01)
*C04B 28/04* (2006.01)
*B01J 41/02* (2006.01)
*C04B 28/18* (2006.01)
*H01M 8/1016* (2016.01)
*C04B 111/00* (2006.01)

(52) U.S. Cl.
CPC ............ *C25B 13/04* (2013.01); *H01M 8/083* (2013.01); *H01M 8/1016* (2013.01); *C04B 2111/00853* (2013.01); *Y02E 60/366* (2013.01)

(56) References Cited

U.S. PATENT DOCUMENTS 8,492,049 B2   7/2013   Kim et al.

2006/0107874 A1*   5/2006   Castaing ............... C04B 14/043
                                                                  106/638

OTHER PUBLICATIONS

Merle et al., "Anion Exchange Membranes for Alkaline Fuel Cells; A Review", Journal of Membrane Science, 2011, vol. 377, pp. 1-35.
Sata et al., "Change of Anion Exchange Membranes in an Aqueous Sodium Hydroxide Solution at High Temperature", Journal of Membrane Science, 1996, vol. 112, pp. 161-170.
Gülzow, "Alkaline Fuel Cells: A Critical View", Journal of Power Sources, 1996, vol. 61, pp. 99-104.
Arges et al., "Anion Exchange Membrane Fuel Cells", The Chalkboard, The Electrochemical Society Interface, Summer 2010, p. 31-35.
Jönsson, et al., "Onset of Cohesion in Cement Paste", Langmuir, American Chemical Society, 2004, vol. 20, pp. 6702-6709.

\* cited by examiner

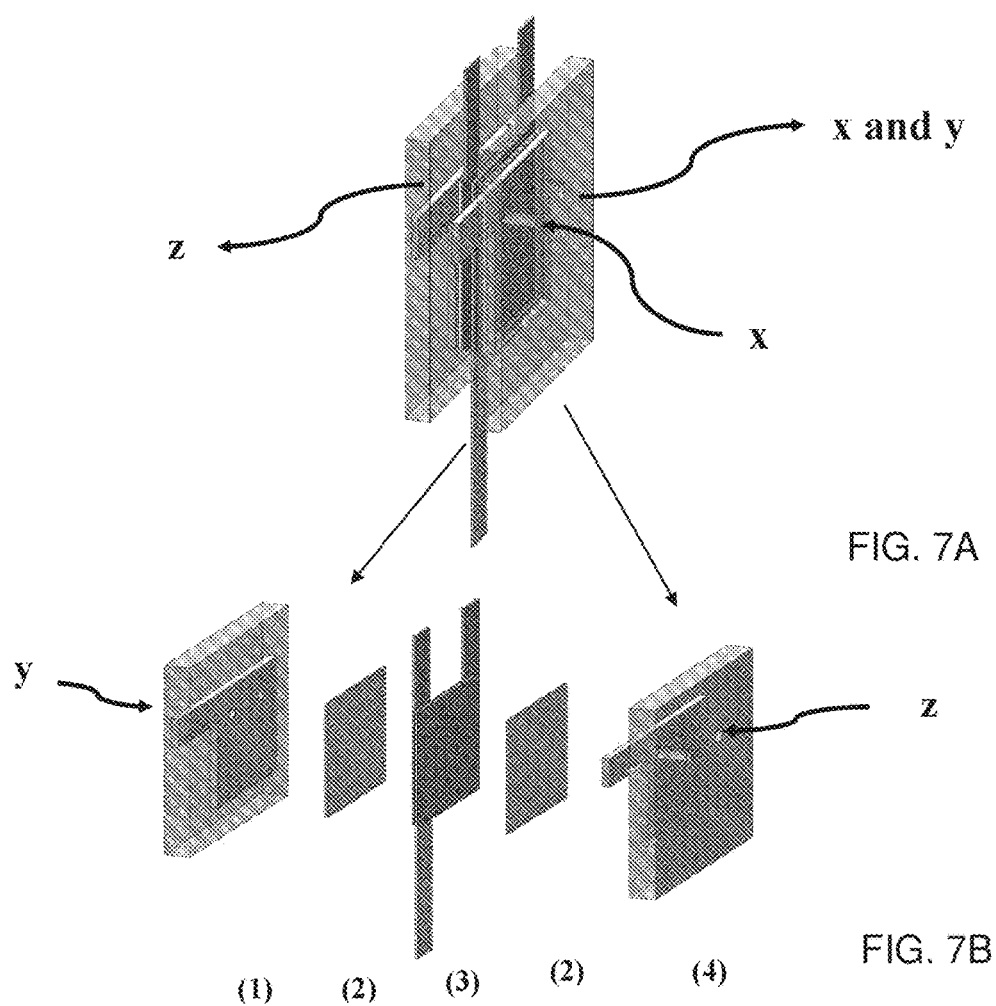

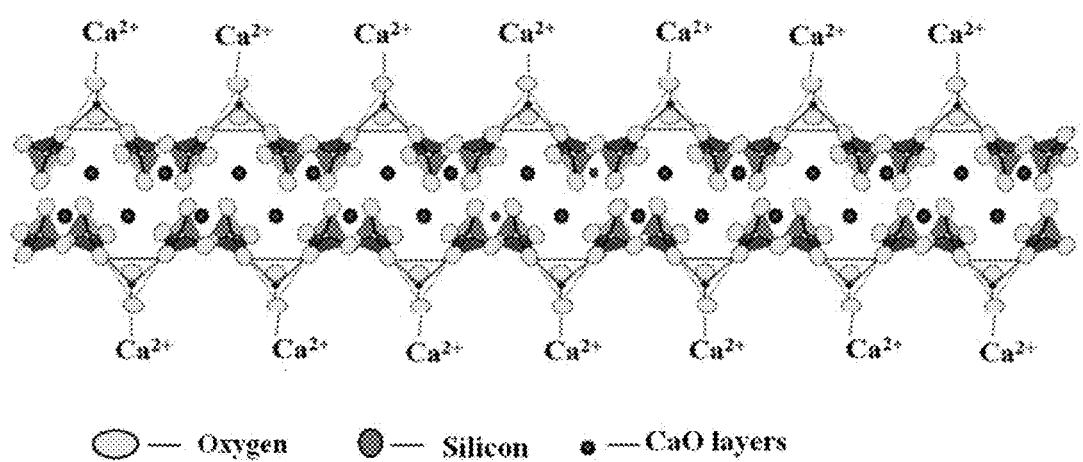
Fig 10:Structure of invented solid inorganic anion exchange membrane

CALCIUM SILICATE HYDRATE ANION EXCHANGE MEMBRANE USEFUL FOR WATER ELECTROLYSIS AND FUEL CELLS AND A PROCESS FOR THE PREPARATION THEREOF

FIELD OF INVENTION

The present invention relates to a Calcium Silicate Hydrate anion exchange membrane useful for water electrolysis and fuel cells and a process for the preparation thereof.

BACKGROUND OF INVENTION

With recent oil shortages and soaring energy prices, electrochemical devices have been accredited as a clean and alternative energy source for a wide range of applications. Electrochemical devices are energy conversion cells that are usually classified as either electrolyzer or fuel cell. Fuel cell is a device that converts the chemical energy into electrical energy. Electrolyzer uses electrical energy to decompose water into hydrogen and oxygen gases. Both cells comprise two electrically conductive electrodes separated by an ion exchange membrane. The efficiency of fuel cell as well as water electrolyzer depends on the health and integrity of core component "membrane." In particular, the research on anion exchange membranes has been of increased attention. It is due to the fact that the alkaline system is able to improve the reaction kinetics, efficiency of oxygen reduction reaction and allows the use of low cost, earth abundant electrocatalyst unlike the precious metal catalysts, which are the major limitations for the widespread implementation of the proton exchange membrane.

Hitherto the most anion exchange membranes are typically composed of a polymer backbone onto which the fixed cationic sites are attached. With reference to Géraldine Merle, Matthias Wessling, Kitty Nijmeijer, Journal of Membrane Science (2011), 377, 1-35, the properties of the membrane are intimately related to the polymer matrix (mechanical, thermal stability, cross linking density) and the nature, concentration of the fixed cationic charges (ionic conductivity, charge density, ion exchange capacity, and transport number). Examples of such membranes are depicted in U.S. Pat. No. 8,436,057 B1 (2013), U.S. Pat. No. 8,492,049 B2 (2013), and U.S. Pat. No. 7,888,397 B1 (2011). Despite its early success, significant strides, and tremendous progress, several drawbacks exist in addition to the high cost. According to Christopher G. Arges, Vijay Ramani, Peter N. Pintauro, The Electrochemical Society Interface, Summer (2010), 31-35, successful commercial production of an alkaline ion exchange membrane includes a robust synthetic route with the proper selection and positioning of cationic ion-exchange groups on the polymer, controlling the membrane morphology to improve mechanical properties, scalability, use of low cost materials and processing methods. Thus synthesizing of cation functionalized hydrocarbon-based polymer backbone is a technical challenge. Usually swelling occurs after alkalization step. i.e., replacements of halide counter ions by hydroxyl groups. In order to attain good ionic conductivity, if the ionic site is increased by enhancing the amount of cationic ion-exchange groups, its mechanical stability will be lost and vice versa. Moreover the electron withdrawing characteristics of the polymer matrix (Toshikatsu Sata, Makie Tsujimoto, Takanori Yamaguchi, Koji Matsusaki, Journal of Membrane Science (1996), 112, 161-170) tend to weaken the stability of the bulky ions and hence reduce the durability. Generation of radical species (peroxy or hydroxyl radicals) in or near the electrode will attack the polymer and chemically degrade it. Further, degradation process can be quickened by electron-withdrawing molecules in the vicinity of fixed cationic site. In addition to that, any change in the water content will result in swelling or shrinkage of membranes, which can lead to the impairment of the membrane-catalyst interface or even membrane breakage (Christopher G. Arges, Vijay Ramani, Peter N. Pintauro, The Electrochemical Society Interface, Summer (2010), 31-35) thus, limiting the use of the membrane at elevated temperatures (above 90° C.). It even requires high humidification to avoid electro-osmotic drag which causes degradation of the membrane, consequently a tremendous decrease in conductivity. Apart from the above mentioned shortcomings, there is always a thirst for inexpensive precursor, nontoxic compounds, solvents and easy reaction steps in order to process the technology in a large scale with low cost and less maintenance.

Thus, commercialization of anion exchange membrane technology (water electrolyzer, fuel cell) is dropped owing to economic factors, material problems and certain inadequacies in the operation of electrochemical devices (Erich Gulzow, Journal of Power Sources (1996), 61, 99-104.). The more fundamental daunting challenges that significantly preclude the successful application are:
i) Scalability, low cost and maintenance
ii) Good stability in alkaline media
iii) High ionic conductivity
iv) Mechanical and dimensional stability

OBJECTIVES OF THE INVENTION

The main object of the present invention is the development of calcium silicate hydrate anion exchange membrane which obviates the drawbacks of the hitherto known prior art as detailed above.

Another object of the present invention is to provide a cheap, stable anion exchange membrane with adequate ionic conductivity.

Yet another object of the invention is to provide of calcium silicate hydrate anion exchange membrane useful for water electrolysis and fuel cells.

BRIEF DESCRIPTION OF DRAWINGS

FIGS. 7 (A) & (B) depicts the schematic cross sectional view of the water electrolysis and fuel cell system respectively.

SUMMARY OF INVENTION

Figure 1:
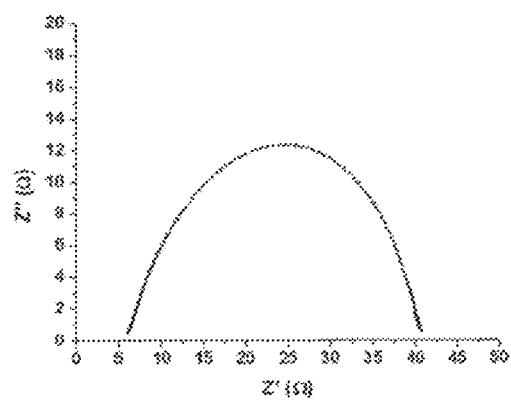
FIG. 1 depicts the Nyquist plot of the invented anion exchange membrane.

Accordingly the present invention describes a Calcium Silicate Hydrate (C—S—H) anion exchange membrane useful for water electrolysis and fuel cells having ionic conductivity in the range of 6.4 to 80 mS/cm with Ion Exchange Capacity (IEC) in the range of 0.22 to 0.45 mequiv/g.

Yet in an embodiment of the present invention the Calcium Silicate Hydrate anion exchange membrane is stable up to 450° C. and in alkaline medium (pH 11.5-14) and non-resistant to hydroxyl ions, having high mechanical strength and tensile strength in the range of 6-7 MPa and 25-30% of elongation at break.

Yet in another embodiment of the present invention the membrane is useful for electrochemical water splitting to generate hydrogen and in a solid alkaline fuel cell Yet in another embodiment of the present invention, a process for the preparation of Calcium Silicate Hydrate (C—S—H) anion exchange membrane comprising the steps of:
  a) mixing portland cement with water to obtain a mixture;
  b) curing the mixture as obtained in step (a) with calcium chloride solution to obtain cured mixture;
  c) treating the cured mixture as obtained from step (b) with calcium hydroxide solution with pH 11-14 followed by washing to get Calcium Silicate Hydrate (C—S—H) anion exchange membrane.

Yet in another embodiment of the present invention, the process for the preparation of Calcium Silicate Hydrate (C—S—H) anion exchange membrane wherein the ratio of cement to water is in the range of 1:0.30 to 1:0.70 preferably 1:0.45.

Yet in another embodiment of the present invention, the ionic conductivity of the membrane is analyzed using Nyquist plot (Impedance spectra). The Ion Exchange Capacity (IEC), static and dynamic transport number of the membrane is studied by Mohr's method, Henderson and Hittorf's method respectively. The thermal and mechanical stability of the membrane is investigated by TGA and stress-strain graph respectively. Elemental analysis of the membrane is carried out by EDX and surface charge analysis using a zeta potential analyzer.

Yet in another embodiment of the present invention, this invention furnishes a Membrane Electrode Assembly (MEA) constituting the in-situ formation of catalyst layers and invented anion exchange membrane, where the membrane is in between anode catalyst and cathode catalyst. This new design (in-situ MEA) avoids the use of electrode binders, catalyst ink preparation, membrane/electrode attachment schemes (hot pressing, decal methods) and minimizes membrane-electrode contact resistance losses and condensed-phase transport losses.

Yet in another embodiment of the present invention, the water splitting behavior of the membrane is studied in a MEA where the electronic conductive metal electrodes (Titanium) are separated from one another by an in-situ MEA. Three electrodes system is used to evaluate the performance with Ti metal as an electrode (anode and cathode) and Hg/HgO as the reference electrode in 0.1 M KOH under a potential of 2.0 V.

Yet in another embodiment of the present invention, the fuel cell performance of the membrane is investigated in a MEA where $H_2$ and $O_2$ gases are passed at anode and cathode respectively.

DETAILED DESCRIPTION OF INVENTION

The present invention is the development of calcium silicate hydrate anion exchange membrane for water electrolysis and fuel cells. Ordinary Portland Cement with the cement to water ratio of 1:0.45 is mixed; After initial setting time, the membrane undergoes curing in 7% calcium chloride solution, then the Cl⁻ ions in the membrane is converted to OH⁻ form by immersing into saturated $Ca(OH)_2$ solution with pH 14 (pH is adjusted using 1 M KOH) and it is washed thoroughly to remove the excess alkali.

In an embodiment of the present invention, the solid inorganic anion exchange membrane is illustrated in FIG. 10.

In the present invention, Ordinary Portland Cement (OPC) is used to synthesize the membrane and it is brought from aditya birla group-ultratech cement ltd.

The basic components of OPC are:
Lime (CaO): 61-63%
Silica ($SiO_2$): 17-25%
Alumina ($Al_2O_3$): 4-8%
Sulphur tri oxide ($SO_3$): 1.3-3%
Iron oxide ($Fe_2O_3$): 0.5-0.6%
Magnesia (MgO): 0.1-4%
Soda and/or potash ($Na_2O+K_2O$): 0.4-1.3%
Chloride ion ($Cl^{-}$): 0.01-0.1%
Insoluble Residue (IR): 0.6-1.75%
The four major compounds in OPC are tricalcium silicate ($Ca_3SiO_5$ in short form $C_3S$), dicalcium silicate ($Ca_2SiO_4$ in short form $C_2S$), tricalcium aluminate ($Ca_3Al_2O_6$ in short form $C_3A$), tetracalcium aluminoferrite ($Ca_4Al_2Fe_2O_{10}$ in short form $C_4AF$) and the extent of its composition are given as follows:

| Compound | Composition as % |
|---|---|
| $C_3S$ | 48-52 |
| $C_2S$ | 22-26 |
| $C_3A$ | 6-10 |
| $C_4AF$ | 13-16 |
| Free lime | 1-2 |

Since $C_3S$, $C_2S$ are the major compositions of OPC, they are playing a crucial role in determining its properties.

| Element | Weigh percent | Atom percent |
|---|---|---|
| O | 57.11 | 76.63 |
| Ca | 41.15 | 22.04 |
| Si | 1.73 | 1.32 |
| Total | 100.00 | 100.00 |

When OPC is mixed with water, $C_3S$, $C_2S$ are hydrated and produce Calcium Silicate Hydrate ($3CaO.2SiO_2.3H_2O$ in short form C—S—H) by the following exothermic reaction:

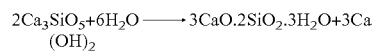

So the major composition of the membrane is Calcium Silicate Hydrate ($3CaO.2SiO_2.3H_2O$ in short form C—S—H). When C—S—H undergoes curing in calcium chloride solution followed by immersion in saturated $Ca(OH)_2$ solution with pH 14, its surface is overcompensated by $Ca^{2+}$ ions.

The novelty of the present invention resides in providing highly conductive and alkaline stable inorganic anion exchange membrane for use in electrolyzer and fuel cell.

The present invention relates to a water electrolyzer and solid alkaline fuel cell comprising solid inorganic anion exchange membrane, Calcium Silicate Hydrate (C—S—H). Ordinary Portland Cement with the cement to water ratio of 1:0.45 is mixed. Lower water/cement ratio has been used to avoid the porosity. After initial setting time, the membrane undergoes curing in 7% calcium chloride solution. Then the $Cl^-$ ions in the membrane is converted to $OH^-$ form by immersing into saturated $Ca(OH)_2$ solution with pH 14 (pH is adjusted using 1 M KOH). Repeated washing has been done to remove the excess alkali.

The Ion Exchange Capacity (IEC) and percentage of conversion ($Cl^-$ into $OH^-$ ions) of the membrane is studied by Mohr's method. The ionic conductivity, static and dynamic transport of the invented membrane is analyzed using Nyquist plot (Impedance spectra), Henderson's and Hittorf's method respectively. The thermal and mechanical stability of the invented membrane is investigated by TGA and stress-strain graph respectively. Elemental analysis is carried out by EDX and surface charge analysis using zeta potential analyzer.

When Ordinary Portland Cement is mixed with water, the cement grains react to form a continuous inorganic phase of Calcium Silicate Hydrate (C—S—H). Thus the "hydrated form of cement paste" at the micrometer level will be in the form of "nanoporous Calcium Silicate Hydrate gel." It has a "sandwich"-like layered structure with a layer of calcium oxide clipped in two layers of silicon-oxygen tetrahedron.

As soon as Ordinary Portland Cement is mixed with water, the dissolved $Ca^{2+}$ ion from the clinker phase is adsorbed on the silica surface and immediately replenished. Thus the surface charge of a Calcium Silicate Hydrate system depends on the molar ratio of CaO to $SiO_2$ (C/S ratio). When Ca/Si ratio is high, the reactive $Ca^{2+}$ ion is adsorbed on the vicinity of surface and makes the surface charge positive. At high surface charge densities, the surface charge of C—S—H is overcompensated by $Ca^{2+}$ ions. According to B. Jonsson, H. Wennerstrom, A. Nonat, and B. Cabane, Langmuir (2004), 20, 6702-6709, this distribution (ionic clouds) of $Ca^{2+}$ will form bond (bridges) only near the isoelectric point of the surfaces (pH 11.6). Thus when the pH is beyond 12, the silanol reacts with $OH^-$ ions of the solution to give $SiO^-$ groups. From the evolution of stoichiometry of C—S—H dispersions in calcium hydroxide solutions, labile $Ca^{2+}$ ion becomes supersaturated at a high value with respect to the precipitation of a Calcium-Silicate-Hydrate ("C—S—H") and the chemical binding of $Ca^{2+}$ ions occur, making the surface charge extremely positive.

Thus the surface site hopping of hydroxyl anions occurs by the fixed $Ca^{2+}$ sites present on the membrane. The small size of the fixed cations $Ca^{2+}$, enhances the exchange sites which improves the ionic conductivity compared to the state of prior art.

In addition to that, mobility of $OH^-$ ion will be increased due to the pore structure and the chemistry of pore solution. In well hydrated phases, capillary pore network (<10 nm) within the interlayer of C—S—H will adsorb the water physically on the surface either in the form of $H_2O$ or $OH^-$. Apart from that, the pore solutions have extremely high concentration of $OH^-$ ions (pH 10-13). Thus water molecules, constructive nanopores and the solution in the pores will provide continuous conductive path (Grothuss mechanism) for migration of ions.

Usually polymeric membrane loses its mechanical stability on excessive water content. But the ceramic membrane described here on the present invention is expected to acquire high mechanical stability and ionic conductivity with increasing water content which is a decisive factor for an essential transport process.

Thus all these paths contribute to the ionic transport and thereby electrolytic conduction through this heterogeneous medium.

FIG. 1 depicts the Nyquist plot of the anion exchange membrane of the present invention. The ionic conductivity of the membrane of the present invention is analyzed by using this plot (Impedance spectra); in which X and Y axis represent the real and imaginary components of impedance ($\Omega$), respectively. The impedance plot displays a modest semi-circle which indicates the conductive nature of the membrane. The membrane resistance ($R_M$) at high frequency region of the impedance plot is obtained by considering the real value of impedance (X-axis) where the imaginary impedance (Y-axis) is at minimum. From the $R_M$, ionic conductivity ($\Omega$) of the membrane is calculated by using the equation:

$$\sigma = L/R_M A$$

where, L(cm) is the thickness of the membrane; A($cm^2$) is the cross sectional area of the membrane. Hence, the ionic conductivity of the invented membrane with thickness 0.416 cm and an area of 1 cm is calculated to be $80 \times 10^{-3}$ S/cm.

Figure 2:
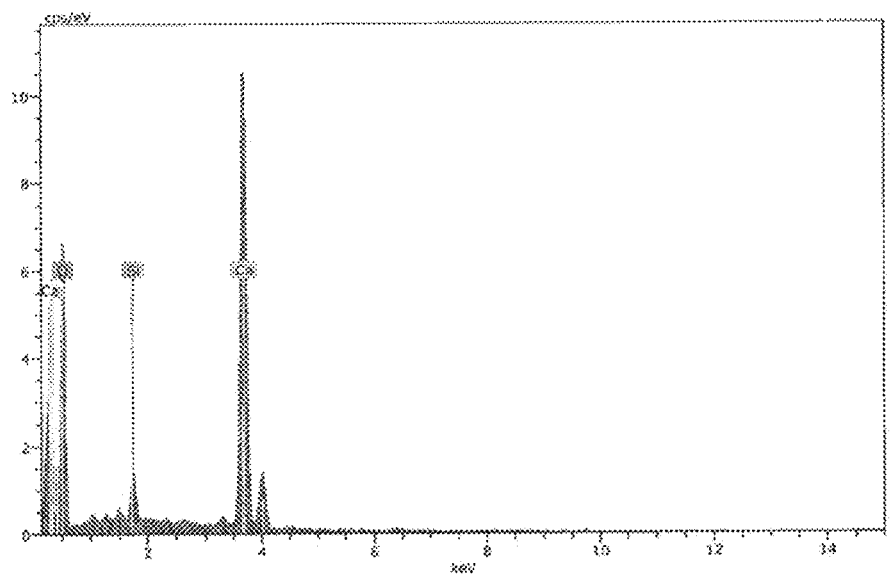
FIG. 2 depicts the chemical composition of the invented anion exchange membrane (prepared at pH 14) using Energy Dispersive X-ray Analysis.

FIG. 2 depicts the chemical composition of the invented anion exchange membrane (prepared at pH 14) using Energy Dispersive X-ray Analysis (EDX). The X-axis represents the energy (eV) of the characteristic X-rays emitted from the particular element, whereas the Y-axis represents the count (cps) of the corresponding X-rays. Higher the count, higher will be the presence of a particular element. From FIG. 2, we can identify the presence of elements such as Ca, Si and O in the invented membrane with atomic percentage of 22.04, 1.32 and 76.63, respectively. Thus, it infers that the ratio of Ca/Si is high and the surface charge will be positive.

Figure 3:
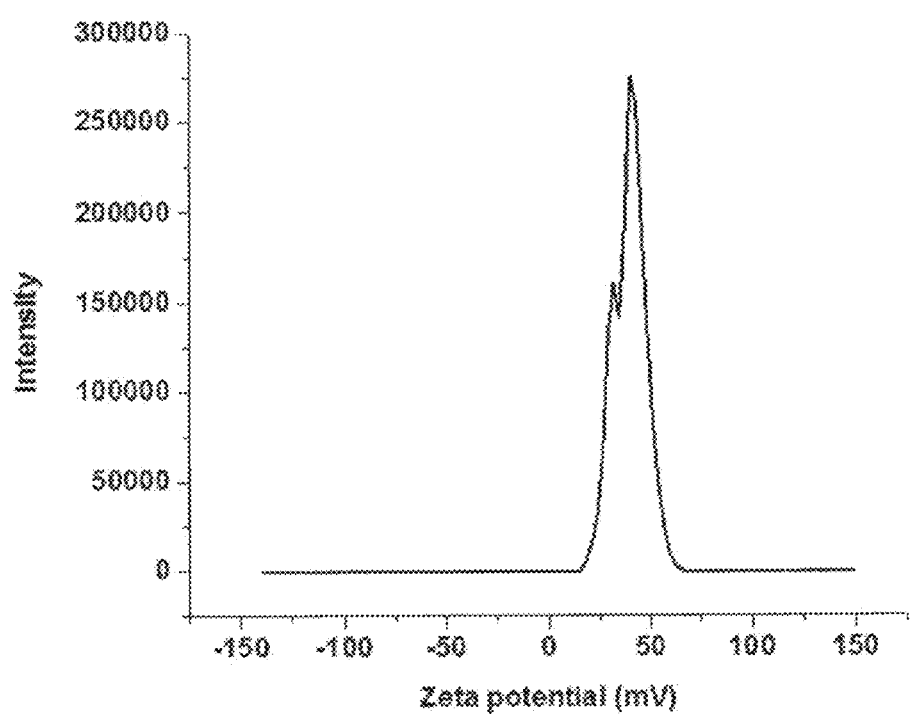
FIG. 3 depicts the surface charge of the invented anion exchange membrane (prepared at pH 14) using zeta potential analyzer.

FIG. 3 depicts the surface charge of the invented anion exchange membrane (prepared at pH 14) using zeta potential analyzer, in which the X-axis represents Zeta potential (mV) of the membrane and Y-axis represents its corresponding intensity. The positive zeta potential (~+50 mV) with high intensity (~250 000 cps) of the invented membrane indicates the high positive surface charge of the membrane.

Figure 4:
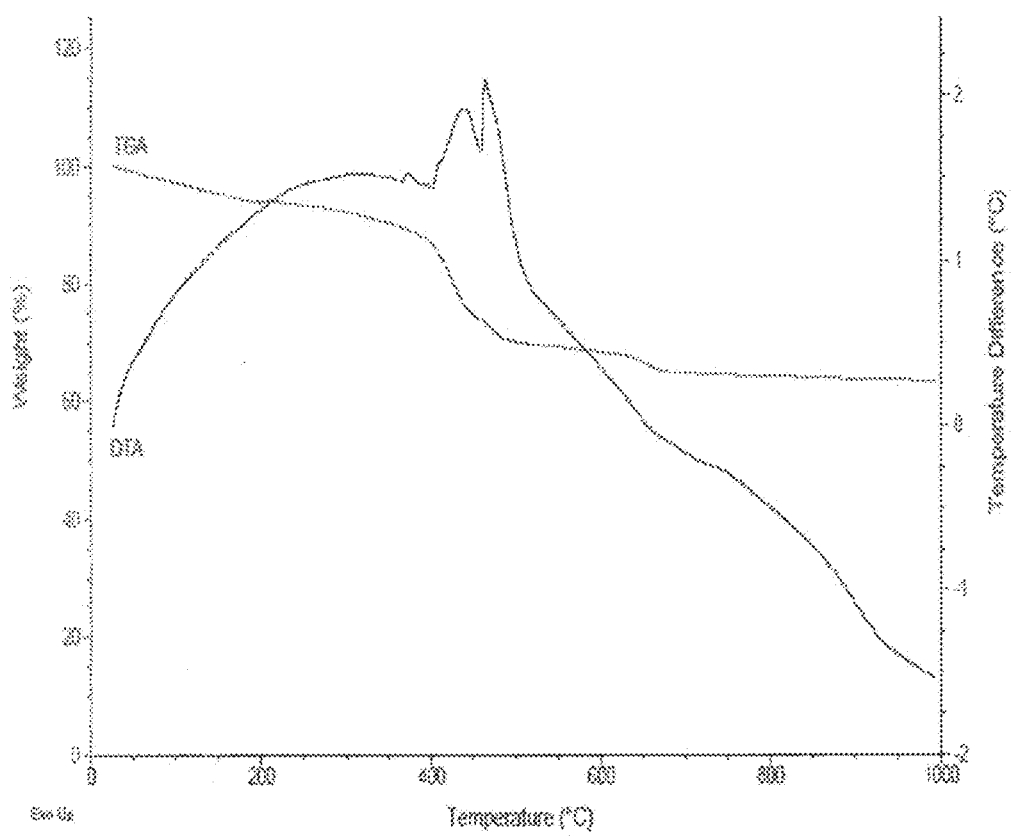
FIG. 4 depicts the thermal stability of the invented anion exchange membrane (prepared at pH 14) is given by Thermogravimetric Analysis(TGA)/Differential thermal analysis (DTA) curve.

FIG. 4 depicts the thermal stability of the invented anion exchange membrane (prepared at pH 14), given by Thermogravimetric Analysis (TGA) and Differential thermal analysis (DTA) curve. From the TGA curve (green line), X-axis indicates the varied temperature (° C.) of the invented membrane and Y-axis represents corresponding weight loss (%) in the membrane. The weight loss indicates degradation/decomposition of the membrane with temperature which in turn reveals the thermal stability. From the TGA curve, the membrane shows two stages of degradation, the first at ~450° C. and the second at ~700° C. Thus, the membrane exhibits thermal stability up to 450° C. From the DTA curve (blue line), X-axis represents varied temperature (° C.) of the membrane, whereas Y-axis represents temperature difference between the membrane and standard reference material (° C.). At 450° C., there is an endothermic peak, confirms the degradation of the membrane.

Figure 5:
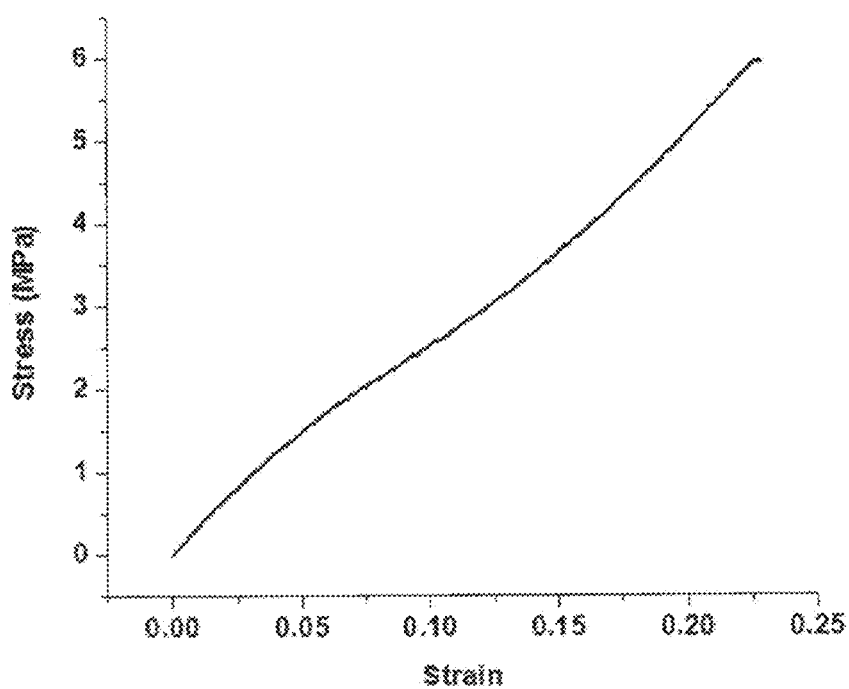
FIG. 5 depicts the mechanical stability of the invented anion exchange membrane (prepared at pH 14) using stress-strain graph.

FIG. 5 depicts the mechanical stability of the invented anion exchange membrane (prepared at pH 14) using stress-strain graph. Here, Y-axis represents the stress (MPa) applied to the invented membrane and X-axis represents the corresponding strain from the membrane. From the graph, the invented membrane exhibits high tensile stress with an ultimate tensile strength of 6.3 MPa and 26% of elongation at break. This reveals that the invented membrane possess high mechanical strength.

Figure 6:
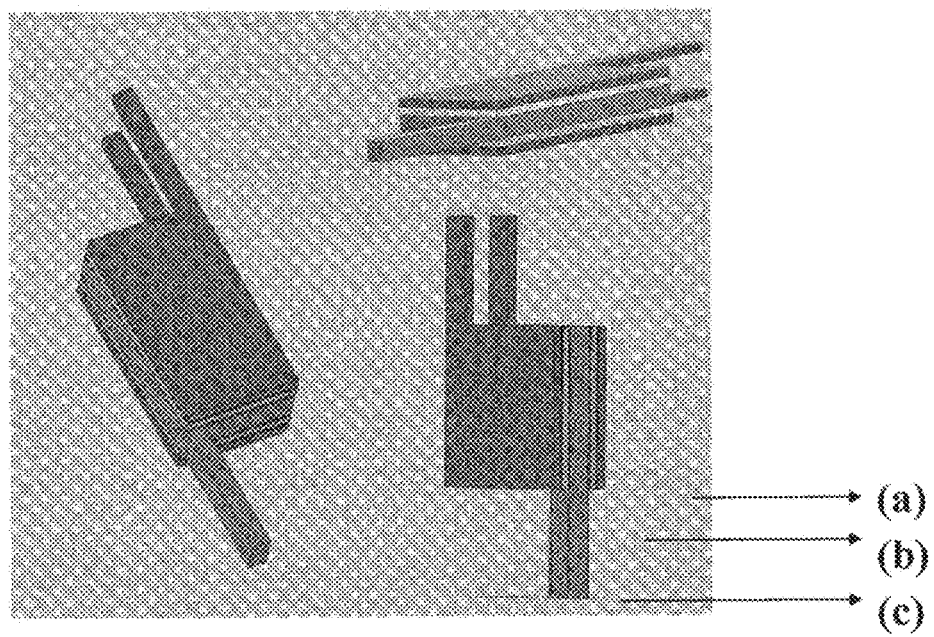
FIG. 6 depicts a cross sectional view of in-situ membrane electrode assembly of the embodiment of the present invention.

FIG. 6 depicts a schematic cross sectional view of in-situ membrane electrode assembly of the embodiment of the present invention. This MEA constitutes an in-situ formation of anode, cathode catalyst layers (Nickel) and invented anion exchange membrane, where membrane (b) is in between the anode catalyst (a) and cathode catalyst (c). This new design (in-situ MEA) avoids the use of electrode binders, catalyst ink preparation, membrane/electrode attachment schemes (hot pressing, decal methods) and minimizes membrane-electrode contact resistance, condensed-phase transport losses.

FIGS. 7 (A) & (B) depicts the schematic cross sectional view of the water electrolysis and fuel cell system, respectively. The system comprises a pair of end plates 1 and 2 which is assembled by bolts 6 and nuts 7, hold together a pair of adjacent commercial gaskets (silicone) 3 and gas diffusion layers (platinum coated titanium mesh) 4, where the invented MEA 5 is interposed between the gas-diffusion layers. Here the gasket and gas-diffusion layers are used to achieve a compact cell assembly; terminal 12 is used for an external circuit connection. There are two set of ports (8, 9) and (10, 11) on end plates 1 (anode) and 2 (cathode) used to feed the reactants and remove the evolved gasses/products from the cell. In case of water electrolyzer, the reactant is water (x) and the evolved products are hydrogen and oxygen gas(y and z), respectively. In case of fuel cell, the reactants and products are vice-versa.

Figures 8A, 8B:
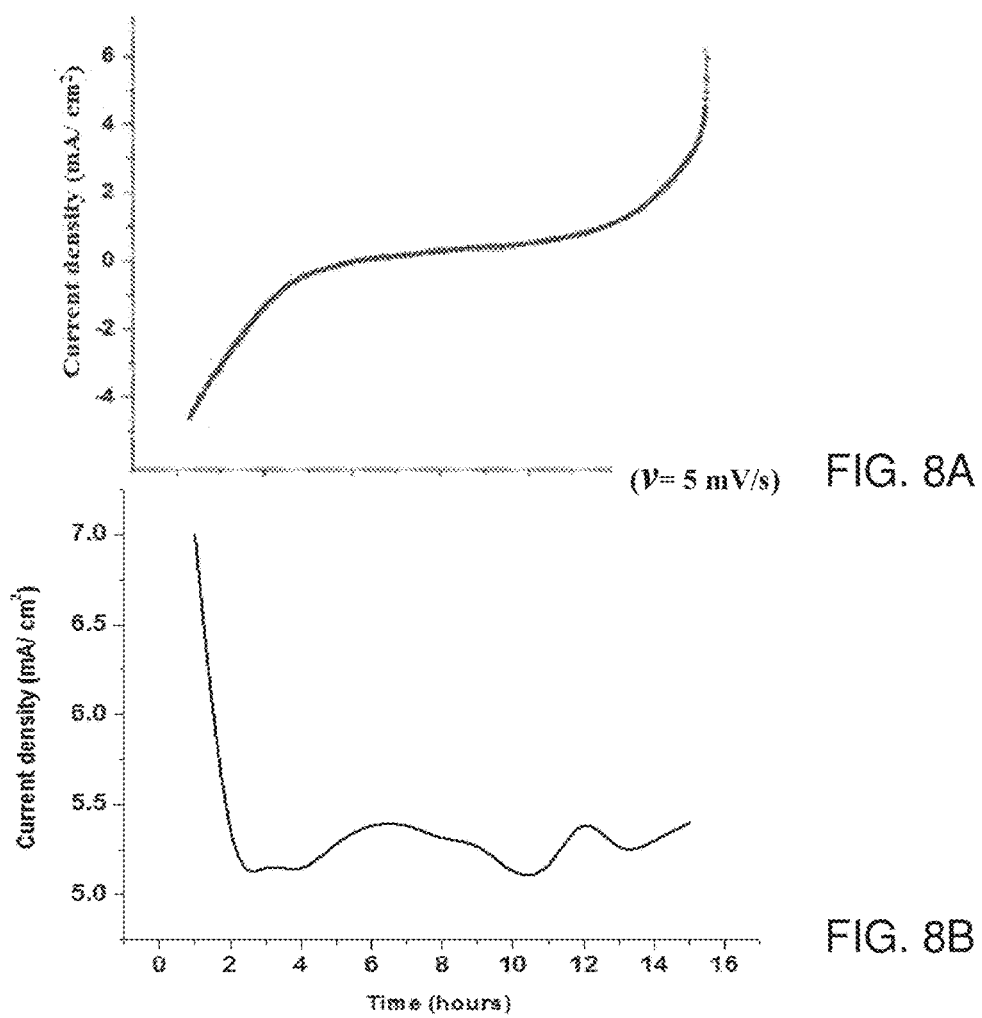
FIGS. 8 (A) & (B) depict the polarization curve and durability test of water electrolysis cell comprising the invented membrane.

FIGS. 8 (A) & (B) depict the polarization curve and durability test of water electrolysis cell comprising the invented membrane. From the polarization curve, X-axis represents the applied potential (V) to the cell and Y-axis represents the corresponding current density(mA/cm$^2$). The cell comprising the invented membrane exhibits a current density of 5 mA/cm$^2$ at 2.0 V; where oxygen and hydrogen gases evolved at 1.6 V and −0.3 V vs. NHE, respectively. From the durability test, X-axis represents the electrolysis duration (min) and Y-axis represents the current density (mA/cm$^2$) from the electrolysis at 2.0V. It shows a constant current density of 5 mA/cm$^2$ at 2.0 V for 15 h. This primary stability test infers that there is no obvious performance degradation.

Figure 9:
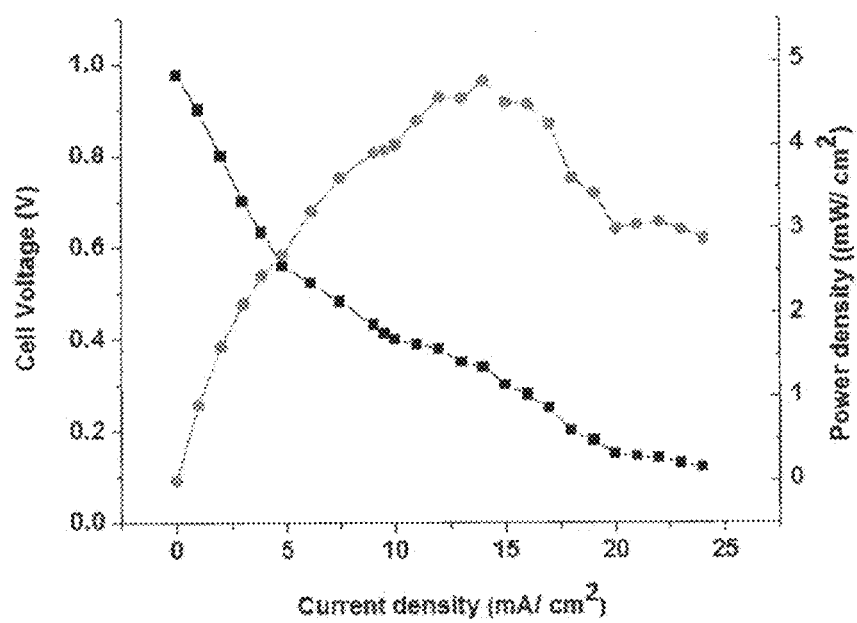
FIG. 9 depicts the $H_2/O_2$ fuel cell performance curve obtained with the invented membrane.

FIG. 9 describes the performance curve of $H_2/O_2$ fuel cell comprising the invented membrane. The X-axis represents the current density exerted from the fuel cell, whereas the Y-axes represent power density (red circles) and cell potential (black squares) at different current densities. From FIG. 9, the cell demonstrates a current density of 5 mA/cm$^2$ at 0.6 V, peak power density of 4.7 mW/cm$^2$ and an open circuit potential of 0.975 V.

The following examples are given by way of illustration of working of the invention in actual practice and therefore should not be construed to limit the scope of the invention.

Example 1

Ordinary Portland Cement with the cement to water ratio of 1:0.45 is mixed. The additional usage of water will lead to pores formation (Yun-Yong Kim, Kwang-Myung Lee, Jin-Wook Bang, and Seung-Jun Kwon, Advances in Materials Science and Engineering Volume 2014, Article ID: 273460), which will allow mixing of hydrogen and oxygen gases and lead to explosion in fuel cell and water electrolysis. So, we have taken minimal water/cement ratio. After initial setting time, the membrane undergoes curing in different percentages of calcium chloride solution like 1%, 3%, 5%, 7%, 9%, and 11%. Repeated washing has been done to remove the surface chloride ion and its corresponding ionic conductivity has been given in Table 1.

TABLE 1

Ionic conductivity of the membrane For different percentages of calcium chloride curing solution

| Calcium chloride curing solution (%) | Ionic conductivity (×10$^{-4}$ S/cm) |
|---|---|
| 1 | 1.3 |
| 3 | 23 |
| 5 | 35 |
| 7 | 64 |
| 9 | 58 |
| 11 | 61 |

From the table, we can infer that the membrane's ionic conductivity becomes saturated after 7% of calcium chloride curing solution. It may be due to the saturation of Ca$^{2+}$ sites. Thus 7% of calcium chloride solution has been taken as an optimum concentration for curing solution and taken for further studies.

Example 2

Ordinary Portland Cement with the cement to water ratio of 1:0.45 is mixed. Lower water/cement ratio has been used to avoid the porosity. After initial setting time, the membrane undergoes curing in 7% calcium chloride solution. Then the Cl$^-$ ions in the membrane is converted to OH$^-$ form by immersing into saturated Ca(OH)$_2$ solution with pH 11.5 (pH is adjusted using 1 M KOH). Repeated washing has been done to remove the excess alkali.

Example 3

Ordinary Portland Cement with the cement to water ratio of 1:0.45 is mixed. Lower water/cement ratio has been used to avoid the porosity. After initial setting time, the membrane undergoes curing in 7% calcium chloride solution. Then the Cl$^-$ ions in the membrane is converted to OH$^-$ form by immersing into saturated Ca(OH)$_2$ solution with pH 14 (pH is adjusted using 1 M KOH). Repeated washing has been done to remove the excess alkali.

TABLE 2

Membrane Properties

| Example | 2 | 3 |
|---|---|---|
| Ionic Conductivity (mS/cm) | 6.4-32 | 57-80 |
| Ion exchange capacity IEC (mequiv/g) | 0.22-0.33 | 0.36-0.45 |
| Percentage of Conversion (Cl$^-$ into OH$^-$ ions) | 100% | 100% |
| Water Uptake (%) | 37-42 | 43-45 |
| Swelling | No | No |
| Static Transport Number | 0.89-0.93 | 0.94-0.97 |
| Dynamic Transport Number | 0.61-0.63 | 0.67-0.77 |

TABLE 3

Membrane stability in alkaline media

| Example-Ionic Conductivity (mS/cm) | Treatment | | | | | | | | |
|---|---|---|---|---|---|---|---|---|---|
| | None | KOH 1M | | | | KOH 2M | | | |
| | | 1 day | 3 days | 6 days | 9 days | 1 day | 3 days | 6 days | 9 days |
| 1 | | | | | | | | | |
| 2 | 6.4-32 | 6.0-30 | 0.21-12 | 0.02-0.5 | 0.004-0.13 | 6.2-29 | 0.1-19 | 0.005-0.09 | 0.0007-0.05 |
| 3 | 57-80 | 53-79 | 36-78.5 | 13-78 | 0.9-78 | 55-77 | 23-74 | 0.5-72 | 0.3-72 |

Table 2 and 3 demonstrate the high and stable ionic conductivity of the invented anion exchange membrane. Since there will not be any Hofmann elimination reaction that usually occurs in an organic membranes, the invented membrane shows highly stable ionic conductivity when immersed in alkaline medium. On comparing Example 2 and Example 3, the membrane prepared with pH 14 (example 3) shows higher and stable ionic conductivity than membrane prepared with pH 11.5 (example 2). The favorable effect at high pH is due to more chemical binding of $Ca^{2+}$ ion occurs. This would result in strong positive surface charge density and hence more hopping sites for conduction. Thus the anion exchange membrane prepared with pH 14 is taken for further studies.

Example 4

A further aspect of the present invention provides a Membrane Electrode Assembly (MEA) comprising the described membrane and a method for preparing such a MEA. The disclosed MEA can be incurred by a very simple process. The following procedure is used for the specimen preparation:

Ordinary Portland Cement with the cement to water ratio of 1:0.45 is mixed. Lower water/cement ratio has been used to avoid the porosity. Nickel deposited carbon cloth (reaction catalyst layer) is placed on both sides of the membrane before drying. After initial setting time, this sandwich-type membrane undergoes curing in 7% calcium chloride solution. Then the Cl⁻ ions in the membrane is converted to OH⁻ form by immersing into saturated $Ca(OH)_2$ solution with pH 14 (pH is adjusted using 1 M KOH). Repeated washing has been done to remove the excess alkali.

This integrated contiguous layer (anode-electrolyte-cathode body) in the form of slab results in enhancing the thorough use of active components by providing intimate interfaces between the electrolyte and either electrode. Thus it reduces the interfacial resistance, provides excellent mechanical integrity and good handling ability.

A water electrolysis and fuel cell system is used to evaluate the performance of the prepared MEA. The water splitting behavior of the membrane is studied in a water electrolyzer system where the electronic conductive metal electrodes (Titanium) are separated from one another by the invented sandwich type membrane. Water is passed at the cathode and three electrodes system is used to evaluate the performance with Ti metal as an electrode (anode and cathode) and Hg/HgO as the reference electrode in 0.1 M KOH under the potential of 2.0 V. The invented membrane exhibits a current density of 5 mA/cm² at 2.0 V and oxygen and gases have evolved at 1.6 V and −0.3 V respectively. For checking the stability, chronoamperometry has run for 15 h, which shows a constant current density of 5 mA/cm² at 2.0 V. This primary stability test infers that there is no obvious performance degradation.

The fuel cell performance of the membrane is investigated in a MEA where $H_2$ and $O_2$ gases are passed at anode and cathode respectively. FIG. 9 describes the $H_2/O_2$ fuel cell performance curve obtained with the invented membrane. It shows peak power density of 4.7 mW/cm² and an open circuit potential of 0.975 V.

ADVANTAGES OF THE INVENTION

The advantages of the present invention are the developed solid anion exchange membrane is environmentally benign, cheap, earth abundant and the second most substance used. Since the membrane does not possess any organic moieties, it is well suited to operate at elevated temperatures and pressures.

This ion exchange membrane can also be used in electro dialysis, salt splitting, and other electrochemical applications.

We claim:

1. A Calcium Silicate Hydrate (C—S—H) anion exchange membrane consisting of cured and treated material from a mixture of portland cement mixed with water including up to 7% calcium chloride solution for curing the mixture and calcium hydroxide solution with a pH of 11-14 used for treating the mixture, wherein
    said anion exchange membrane having an ionic conductivity in the range of 6.4 to 80 mS/cm with an Ion Exchange Capacity (IEC) in the range of 0.22 to 0.45 mequiv/g, and
    said anion exchange membrane is useful for water electrolysis and fuel cells.

2. The Calcium Silicate Hydrate anion exchange membrane as claimed in claim 1, wherein the membrane is stable up to 450° C. and in alkaline medium (pH 11.5-14) and non-resistant to hydroxyl ions, having high mechanical strength and tensile strength in the range of 6-7 MPa and 25-30% of elongation at break.

3. The Calcium Silicate Hydrate anion exchange membrane as claimed in claim 1 wherein, the membrane is useful for electrochemical water splitting to generate hydrogen and in a solid alkaline fuel cell.

* * * * *